Nov. 4, 1952  P. DE V. D'AVAUCOURT  2,616,478
METHOD AND APPARATUS FOR FORMING SAWING WIRES
Filed Dec. 4, 1947
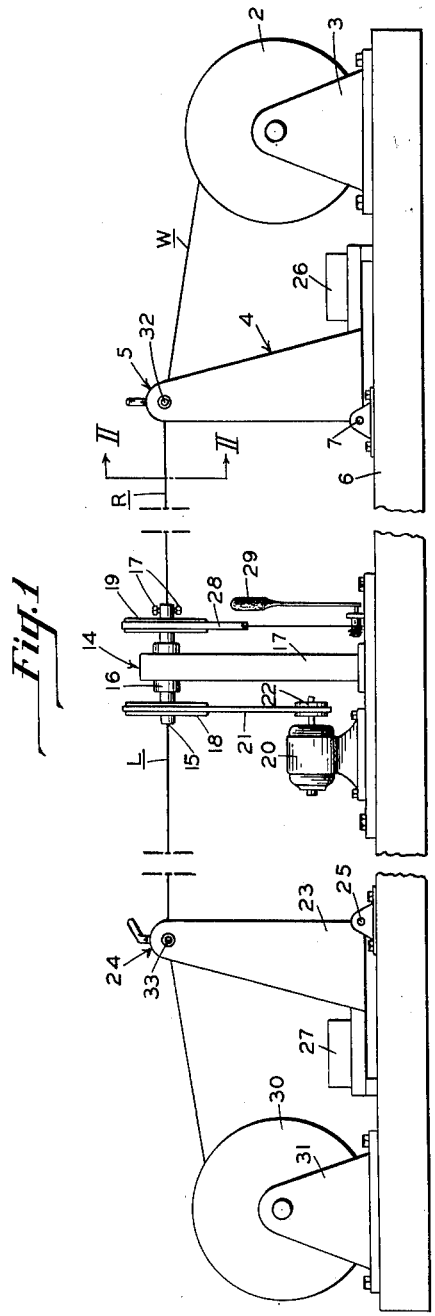
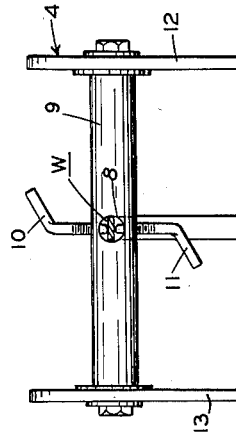
Inventor
PIERRE DE VITRY D'AVAUCOURT
by
Harold J. Borthwick
Attorney Patented Nov. 4, 1952

2,616,478

UNITED STATES PATENT OFFICE 2,616,478

METHOD AND APPARATUS FOR FORMING SAWING WIRES

Pierre de Vitry d'Avaucourt, Bainbridge, Pa.

Application December 4, 1947, Serial No. 789,705

10 Claims. (Cl. 153—78)

This invention relates to a method and apparatus for forming sawing wires and is particularly concerned with the formation of sawing wires from relatively thin, flat strips of steel which may be tempered or may be alloyed.

Sawing wires are used extensively in the quarrying of stone, including marble, granite, slate, limestone, and the like, and such wires are employed primarily to convey an abrading medium, such as sand, artificial abrasive, steel shot, or the like which is effective for cutting the stone. The cutting or sawing action which is effected is actually an abrasive action. In these saws, the wire may be twisted in such a manner that one portion of the working surface of the wire has a right-hand helix and an adjacent portion has a left-hand helix. The present invention is directed to a method and apparatus for forming a saw wire of this type in which the helices of adjacent portions of the wire are of opposite hand.

These saw wires are welded at their terminal portions into a continuous band, and in stone quarrying the bands will in some instances be as long as 10,000 feet. In practically all instances the wires are over 500 feet long. The present invention is particularly concerned with the formation of the wires for such bands. Particularly good results are achieved in stone cutting if the saw wire has its adjacent portions of different helical twist each about 100 feet or more in length, up to a maximum of about 200 feet. It is necessary to provide a wire with such alternating twist in order to overcome the reaction which would normally obtain in the wire if twisted in a single direction. This reaction would result in a cut which is not straight or true but which tends to vary in the direction of the reaction of the wire, giving an inclined cut.

Since the wires are of extreme length, it is desirable to form them with as few joints as possible. The joints are generally welded as shown in my prior patent, the making of such joints is quite a task, and there is always some possibility of breakage at the joints.

It is an object of my invention to provide a method and apparatus which will be effective for simultaneously forming the adjacent portions of a saw wire with helical twists of opposite hand.

It is a further object of my invention to provide a method and apparatus in which the helical twist of one hand for the desired length, say 100 to 200 feet, may be formed simultaneously with the helical twist of the opposite hand in the adjacent 100 to 200-foot length.

Another object of my invention is to provide a method and apparatus whereby wire of indefinite length may be provided with helical twists of opposite hand throughout such indefinite length, without the necessity of forming the wire from individually twisted sections with welded joints.

According to the present method, the wire is firmly clamped at spaced points which may be 200 to 400 feet apart, either closer together or farther away, depending upon the wire to be formed. The wire intermediate the outermost points of clamping, preferably in the center thereof, is then connected to a rotating member and a rotative force is applied to the wire at the point of connection. Rotation is continued until the edge or working surface of the wire has been twisted into a double helix, one portion having a right-hand twist and the other portion having a left-hand twist, the twist or pitch being less than that desired in the final wire. Thereupon, the rotative force is disengaged, a brake is applied to prevent uncontrolled rotation of the wire in a direction reverse to the direction of rotation by the rotative force, and the brake is gradually released to permit the wire to unwind until substantially all of the spring inherent in the twisted wire has been removed. The clamps are released and the wire moved to a position where the twisted portion clears the machine with the portion having a right-hand twist, for example, lying adjacent one end thereof. The wire is then clamped in position and the operation repeated. This effects a twisting in the adjacent portion of the wire which is of opposite hand to the portion previously completed and thus the wire is formed with each adjacent section of opposite hand.

In order that my invention may be more readily understood, I shall describe the same in conjunction with the attached drawing in which:

Figure 1 is a diagrammatic view illustrating a piece of apparatus constituting one embodiment of my invention, useful in the practice of my method;

Figure 2 is an enlarged sectional view taken on the line II—II of Figure 1 and showing one form of pivoted clamping mechanism.

The wire which may be formed into a saw wire by the present invention may vary to a considerable extent. One type which I have successfully manufactured in accordance with my method and using my preferred apparatus was in the nature of a flat metal ribbon having the following specifications: MB spring wire, cold rolled steel, flat .179" x .087" natural edge No. 4. This steel has a tensile strength of about 150,000 pounds per square inch. It is furnished in reels of lengths between 3500 and 4500 feet, preferably free of welded joints, although welded joints can be tolerated if need be.

In Figure 1, a reel of such wire is indicated at 2, positioned in a roll stand 3 for convenient unwinding. The wire is fed through a clamping support 4 which is provided with a wire clamping arrangement 5 which is shown in more detail in Figure 2. The support 4 is pivoted to the base 6 at 7. As shown in Figure 2, the wire W passes through an opening 8 in a spindle 9 and is clamped by means of clamp screws 10 and 11 which are drawn up into engagement with the wire prior to the commencement of the twisting operation. The spindle 9 is journaled in end members 12 and 13 constituting portions of the support 4, for the purpose of permitting a slight rotative movement of the clamping spindle upon movement of the support 4 about its pivot 7, as will be more fully hereinafter described.

The wire is then fed through a central driving arrangement indicated at 14. It includes a hollow central spindle 15 through which the wire W is free to pass. The spindle 15 is mounted in a bearing 16 which is supported by a stand 17 secured to the base 6. Clamping means 17 are provided in the spindle 15 to firmly secure the wire so that it will rotate with the spindle 15. Two bolts or hollow headed screws may be used for this purpose. A pulley 18 is attached to one end of the spindle 15 and a brake band 19 is attached to the opposite end. A suitable source of power, such as an electric motor 20 is provided for rotating the spindle 15. Driving is effected through a belt 21 which encircles pulley 18 and a pulley 22, attached to the motor shaft.

The wire W then passes to a support 23 which corresponds to the support 4. A pivoted clamping arrangement 24 similar to the arrangement 5 is provided and the support 23 is pivoted at 25 to the base 6 in a manner similar to support 4. This pivoting permits limited movement of the clamping arrangements 5 and 24 toward the central driving arrangement 14. Weights 26 and 27 are provided on the supports 4 and 23 to apply a yielding tension to the wire during twisting as will be explained in greater detail.

The central spindle is provided with a brake band 28 which encircles the brake drum 19 which is affixed to the hollow spindle 15. A brake lever 29 is provided for actuating the brake band 28.

At the end opposite the reel 2 is a corresponding reel 30 mounted in a roll stand 31 for receiving the completed cutting wire subsequent to formation of the helical twists therein.

Suitable power equipment is provided for winding the material onto the reel 30 but this forms no part of the present invention and has not been shown.

In order to illustrate the method of operation, assuming that the supports 4 and 23 are spaced apart about 200 feet with the central stand or support 14 disposed substantially midway between the two supports 4 and 23 and employing a wire of the specifications referred to above, the untwisted wire is fed from the reel 2 through the clamping member 5, the spindle 15 and into the clamping arrangement 24. The clamp 5 is closed against the wire W by rotating the clamp screws 10 and 11, Figure 2, and the wire is pulled tight between clamps 5 and 24 to a degree just sufficient to bring the weights 26 and 27 into play to apply tension to the wire. The clamp 24 is then closed and the wire is secured to the spindle 15 by the locking screws 17. Thus, the wire is firmly held at spaced points about 200 feet apart and at the center thereof. The motor 20 is then started up and rotation is imparted to the spindle 15. A one horsepower motor may be used for this purpose with a spindle speed of 500 revolutions per minute on the spindle 15. As rotation of the motor proceeds, the wire is twisted, with the portion to the right of the connection 17 being twisted into a right-hand helix and with the portion to the left of the connection 17 being twisted into a left-hand helix. During the twisting, the wire contracts and decreases in length in the neighborhood of 1½ to 2% and this is accommodated by the supports 4 and 23 pivoting about their respective pivots 7 and 25, tension being maintained on the wire, however, by the weights 26 and 27 respectively. The tensioning force gradually diminishes as the weighted supports 4 and 23 pivot about their respective pivots 7 and 25 toward the central support 14 as twisting proceeds and the length of the ribbon decreases. Since the spindle 9 of the clamp 5 and the corresponding spindle of the clamp 24 are free to rotate in their respective supports, the wire will not be bent as the supports pivot toward the center of the machine. Any substantial bending would be objectionable and would have to be removed by hand.

Assuming that the pitch desired in the final cutting wire is 1⅜", rotation of the spindle 15 will be stopped after a sufficient number of turns has been effected to provide a pitch about 20% less than 1⅜". This overtwisting depends upon the nature of the steel employed, its springing movement and other variable factors. Upon completion of the twisting, the brake 28 is applied by operation of the hand lever 29 and rotation of the spindle 15 stopped. The hand lever 29 is then actuated to gradually release the brake 28 and the wire tends to uncoil to an extent equivalent to about 20% in the particular example here under discussion, providing a resulting wire which has a 1⅜" pitch and which is free of any twisting moment which might result in improper cutting.

All of the clamps are now released and the wire is wound on the reel 30 until the untwisted wire at the point 28 reaches a point where it may be clamped at the point 33. The clamps 5, 24 and 17 are applied with the wire stretched taut and the operation is repeated. It will be remembered that the portion of the wire "L" has had a left-hand helix impressed thereon and the portion of the wire "R" has had a right-hand helix impressed thereon. When the wire is moved to a position where the point 32 which constitutes the end of the right-hand helix is at position 33, the adjacent portion to the right thereof will be formed in the next succeeding operation with a left-hand helix and thus, each alternate portion of the wire will have a helix of opposite hand.

The operation is repeated until all of the wire on reel 2 has been twisted and has been received on the reel 30.

When operating with a steel wire of known specifications, it is possible to determine within commercial limits the actual twist imparted to the wire by the amount of shrinkage which has occurred, resulting in the movement of the supports 4 and 23 about their pivots and the operator can conveniently and with adequate precision discontinue the rotation of the motor 13 when the supports 4 and 23 have assumed a predetermined position. Any conventional control equipment may be employed for automatically stopping the motor 20 upon the movement of the supports to their appropriate relative positions.

By my method and with the use of my apparatus, I have made it possible to form a multiple helix sawing wire which is very straight and uniformly twisted. The wire is substantially free of springiness in its finished condition. It may be formed in great lengths without the necessity for welding together adjacent sections of opposite hand.

While I have illustrated and described a preferred embodiment of both my method and apparatus, it will be understood that the invention may be otherwise embodied and practiced within the scope of the following claims.

I claim:

1. In a method of forming sawing wire from a single flat metal ribbon of high tensile strength steel, the steps comprising holding said ribbon against free rotation at spaced points, imparting a motion of rotation to said ribbon at a point intermediate said spaced points to impart to said wire a helical twist throughout the length of said ribbon between said spaced points with the helix of one portion from the intermediate point to one of said spaced points being of one hand and the helix from the intermediate point to the other of said spaced points being of the opposite hand, and applying gradually diminishing yielding tension to said ribbon during the twisting thereof.

2. In a method of forming sawing wire from a single flat metal ribbon of high tensile strength steel, the steps comprising holding said ribbon against free rotation at spaced points, imparting a motion of rotation to said ribbon at a point intermediate said spaced points to impart to said wire a helical twist throughout the length of said ribbon between said spaced points with the helix of one portion from the intermediate point to one of said spaced points being of one hand and the helix from the intermediate point to the other of said spaced points being of the opposite hand, permitting said ribbon to contract in length during the twisting thereof and simultaneously applying gradually diminishing yielding tension thereto.

3. In a method of forming sawing wire from a single flat metal ribbon of high tensile strength steel of indefinite length with adjacent portions of said sawing wire having helical twists along the length of said wire of opposite hand, the steps comprising holding said ribbon at a first point adjacent a helically twisted portion thereof, and at a second point spaced therefrom and, at a location intermediate said points, imparting a movement of relative rotation to said ribbon between said spaced points and said intermediate location along an axis substantially parallel to the length of said ribbon with the relative rotative movement between said first point and said intermediate location being in a direction opposite to the direction of helical twist of said helically twisted portion of the ribbon adjacent thereto and the relative rotative movement between said second point and said intermediate location being in a direction opposite to the direction of relative rotative movement between said first point and said intermediate location, and applying gradually diminishing yielding tension to said ribbon during relative rotative movement thereof.

4. In a method of forming sawing wire from a single flat metal ribbon of high tensile strength steel, the step comprising yieldingly tensioning said ribbon between spaced points of engagement, imparting a movement of relative rotation to said ribbon between said spaced points and a location intermediate said spaced points with the axis of rotation of said wire being substantially parallel to the length of said ribbon to impart to said ribbon a helical twist throughout the length of said ribbon between said spaced points with the helix of one portion from the intermediate location to one of said spaced points being of one hand and the helix from the intermediate location to the other of said spaced points being of the opposite hand, and permitting said wire to contract under said tensioning during twisting thereof by a gradual diminution of said yielding tensioning as said twisting progresses.

5. In a method of forming sawing wire from a single flat metal ribbon of high tensile strength steel, the step comprising yieldingly tensioning said ribbon between spaced points of engagement, imparting a movement of relative rotation to said ribbon between said spaced points and a location intermediate said spaced points with the axis of rotation of said ribbon being substantially parallel to the length of said ribbon to impart to said ribbon a helical twist throughout the length of said ribbon between said spaced points with the helix of one portion from the intermediate location to one of said spaced points being of one hand and the helix from the intermediate location to the other of said spaced points being of the opposite hand, continuing said twisting until the pitch of the helices of said wire are smaller than the desired final pitch, permitting said wire to contract under said tensioning during twisting thereof by a gradual diminution of said yielding tensioning as said twisting progresses, and thereafter increasing the pitch by restrained relative rotation of said ribbon in a direction opposite to the original direction of relative rotation.

6. In an apparatus for forming sawing wire from a single flat metal ribbon of high tensile strength steel, clamps for holding said ribbon at spaced points against free rotation, twisting means engageable with said ribbon at a location intermediate said spaced clamps, said clamps being pivoted and movable toward said twisting means, means for rotating said twisting means to impart simultaneously to the ribbon a helical twist in two directions along an axis parallel to the length of the wire, and means cooperating with said pivoted and movable clamps for yieldingly urging said clamps away from said twisting means with a gradually diminishing tensioning force to apply gradually diminishing tension to said ribbon during twisting thereof and movement of said clamps toward said twisting means.

7. In an apparatus for forming sawing wire from a single flat metal ribbon of high tensile strength steel, a pair of spaced pivoted supports, clamps on said supports for holding said ribbon at spaced points, means for engaging said ribbon at a location intermediate said points, means for imparting a relative rotary motion to said ribbon along an axis parallel to the length of the wire simultaneously in two directions from said intermediate location to said spaced points, and weights carried by said supports for applying a gradually diminishing tensioning force to said ribbon during twisting thereof.

8. In an apparatus for forming sawing wire from a single flat metal ribbon of high tensile strength steel, spaced pivoted weighted supports, a clamp secured to each support for clamping a ribbon to be twisted into a sawing wire, a fixed support intermediate said pivoted supports, a twisting head rotatably mounted on said fixed support, said twisting head comprising a holder to embrace the ribbon and means for fixing the wire to the holder against free rotation, means for driving said twisting head to impart simultaneously to said ribbon a helical twist in two directions along an axis parallel to the length of the wire, said spaced weighted supports being yieldably movable toward said fixed support by movement about their pivots upon contraction of the ribbon during twisting to apply a gradually diminishing tensioning force thereto.

9. In an apparatus for forming sawing wire from a single flat metal ribbon of high tensile strength steel, spaced ribbon clamp supports, a ribbon clamp attached to each support, a twisting head support disposed about midway between said ribbon clamp supports, a twisting head comprising a ribbon clamp mounted on said twisting head support, means for driving said twisting head to impart simultaneously to said ribbon a helical twist in two directions along an axis parallel to the length of the wire, braking means for preventing free rotation of said twisting head in a direction opposed to the direction of rotation of said twisting head during twisting, and means for applying said brake to said twisting head to control the limited unwinding of said ribbon upon completion of twisting and release of said twisting head ribbon clamp.

10. In an apparatus for forming sawing wire from a single flat metal ribbon of high tensile strength steel, the combination with claim 7 of pivots for the ribbon holding clamps substantially parallel to the pivots for said supports to permit limited movement of rotation of the clamps about their pivots upon pivoting of the spaced supports.

PIERRE DE VITRY D'AVAUCOURT.

REFERENCES CITED

The following references are of record in the file of this patent:

UNITED STATES PATENTS

| Number | Name | Date |
|---|---|---|
| 85,542 | Sperry | Jan. 5, 1869 |
| 272,757 | Parker | Feb. 20, 1883 |
| 392,119 | Hardsocq | Oct. 30, 1888 |
| 475,193 | Burton | May 17, 1892 |
| 539,139 | Lee | May 14, 1895 |
| 783,808 | Vogel | Feb. 28, 1905 |
| 881,611 | Norton | Mar. 10, 1908 |
| 1,463,594 | Rust | July 31, 1923 |
| 1,545,407 | Drew | July 7, 1925 |
| 1,934,122 | Hill | Nov. 7, 1933 |
| 1,953,747 | Cleveland | Apr. 3, 1934 |
| 2,443,564 | Kunkle | June 15, 1948 |
| 2,460,846 | Schulze | Feb. 8, 1949 |

FOREIGN PATENTS

| Number | Country | Date |
|---|---|---|
| 261,739 | Great Britain | Nov. 12, 1926 |
| 690,909 | France | June 3, 1930 |
| 560,041 | Great Britain | Mar. 16, 1944 |